United States Patent
Coogan et al.

(10) Patent No.: US 12,486,580 B2
(45) Date of Patent: Dec. 2, 2025

(54) APPLICATION OF TYPE II CHEMICAL CONVERSION COATINGS (CCCS) USING FOAMING AGENTS

(71) Applicant: Hamilton Sundstrand Corporation, Charlotte, NC (US)

(72) Inventors: Cody Coogan, Columbiana, AL (US); Kevin R. Bordage, Westfield, MA (US); Blair A. Smith, South Windsor, CT (US); Erik W. Karlen, Rockford, IL (US); Brodie Gross, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 821 days.

(21) Appl. No.: 17/704,769

(22) Filed: Mar. 25, 2022

(65) Prior Publication Data
US 2023/0304161 A1    Sep. 28, 2023

(51) Int. Cl.
| | |
|---|---|
| C23C 22/30 | (2006.01) |
| C09K 3/30 | (2006.01) |
| C09K 23/16 | (2022.01) |
| C23C 22/58 | (2006.01) |
| C23C 22/78 | (2006.01) |
| C09K 107/00 | (2006.01) |

(52) U.S. Cl.
CPC ............... C23C 22/58 (2013.01); C09K 3/30 (2013.01); C09K 23/16 (2022.01); C23C 22/78 (2013.01); C09K 2107/00 (2013.01); C23C 2222/10 (2013.01)

(58) Field of Classification Search
CPC .................................................. C23C 2222/10
See application file for complete search history.

(56) References Cited

U.S. PATENT DOCUMENTS

| | | | |
|---|---|---|---|
| 3,729,346 | A | 4/1973 | Gotta et al. |
| 4,060,433 | A | 11/1977 | Chunat et al. |
| RE40,406 | E | 7/2008 | McCormick et al. |
| 9,567,453 | B2 | 2/2017 | Noue et al. |
| 2021/0348278 | A1 | 11/2021 | Strock et al. |

FOREIGN PATENT DOCUMENTS

| | | |
|---|---|---|
| CN | 109440092 A | 3/2019 |
| CN | 112522717 A | 3/2021 |

OTHER PUBLICATIONS

Extended European Search Report for EP Application No. 23161825.7, dated Aug. 21, 2023, 9 pages.
H. Mace et al., "Technology of Consistent Aerosol Foam Dispensing Without Costly Gadgetry", from J. Soc. Cosmetic Chemists, 20, (Aug. 19, 1969) pp. 511-523.
Made How, Shaving Cream, from <http://www.madehow.com/Volume-1/Shaving-Cream.html>, visited Mar. 23, 2022, 5 pages.

*Primary Examiner* — Lois L Zheng
(74) *Attorney, Agent, or Firm* — Kinney & Lange, P.A.

(57) ABSTRACT

In one aspect, a spray foam chemical conversion coating includes a non-hexavalent chromium aqueous chemical conversion coating solution, a foaming agent, and a propellant. In another aspect, a method of producing a corrosion-resistant coating includes spraying a foam chemical conversion coating on a surface of a metal substrate, allowing the foam chemical conversion coating to react with the surface, and removing excess foam chemical conversion coating from the surface. The foam chemical conversion coating contains no hexavalent chromium.

17 Claims, 1 Drawing Sheet

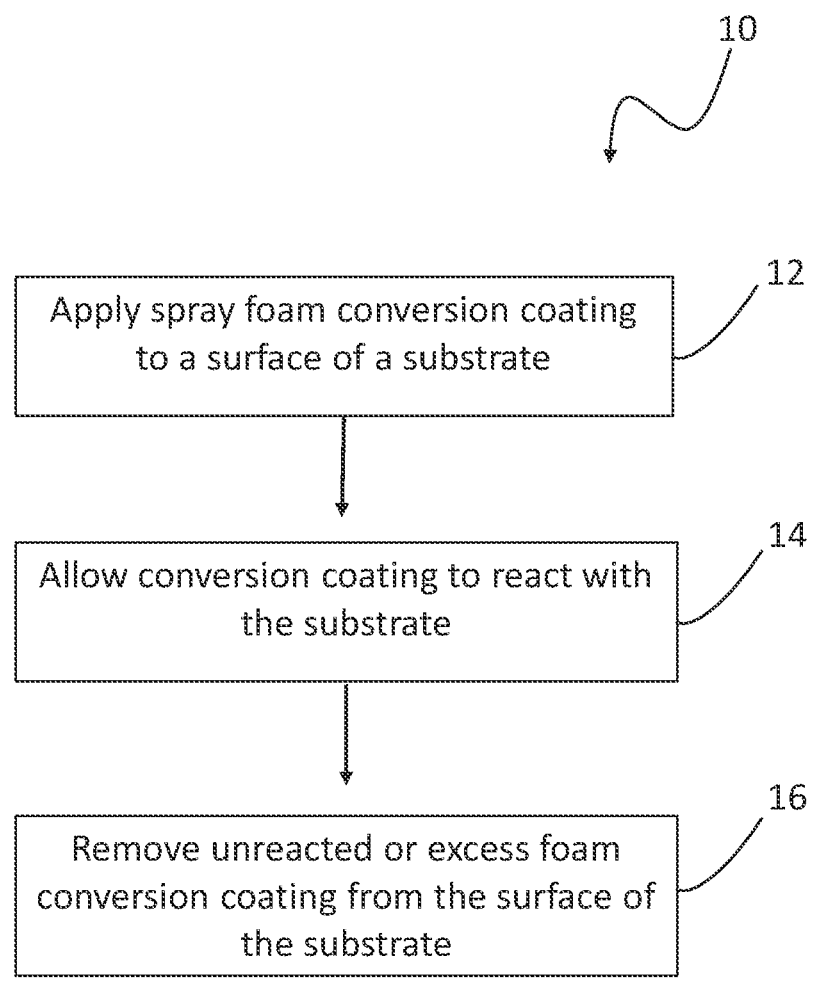

APPLICATION OF TYPE II CHEMICAL CONVERSION COATINGS (CCCS) USING FOAMING AGENTS

BACKGROUND

The present disclosure relates generally to barrier coatings for metal substrates and, more particularly, to non-hexavalent chromium chemical conversion coatings (CCCs) and the application thereof.

Aluminum and aluminum alloy components used in aeronautics and aerospace applications are subjected to environments that cause corrosion. MIL-DTL-81706 Type II CCCs are used to form a corrosion-resistant protective barrier coating by reaction with the surface of aluminum and aluminum alloy substrates. Type II refers to compositions containing no hexavalent chromium, which has been banned in many countries. Repair of these barrier coatings is often required over the operational life of a component. On-wing repair is preferred but has associated challenges related to spatial constraints and the orientation of surfaces requiring repair. For example, surfaces that allow for solution dripping can pose environmental and operator hazards. Typically, Type II CCCs must remain in contact with a surface for up to 20 minutes to react. Touch-ups are often applied by applicator pens, which minimize solution dripping and operator exposure. However, because the liquid dries quickly, multiple applications are required. Furthermore, non-drip applicator pens are not available for all coating and solution options. A need exists for improved Type II CCCs that allow for on-wing repair while minimizing environmental and operator risks.

SUMMARY

In one aspect, a spray foam chemical conversion coating includes a non-hexavalent chromium aqueous chemical conversion coating solution, a foaming agent, and a propellant.

In another aspect, a method of producing a corrosion-resistant coating includes spraying a foam chemical conversion coating on a surface of a metal substrate, allowing the foam chemical conversion coating to react with the surface, and removing excess foam chemical conversion coating from the surface. The foam chemical conversion coating contains no hexavalent chromium.

The present summary is provided only by way of example, and not limitation. Other aspects of the present disclosure will be appreciated in view of the entirety of the present disclosure, including the entire text, claims and accompanying FIGURES.

BRIEF DESCRIPTION OF THE DRAWINGS

FIG. 1 is a flow chart depicting a method of producing a corrosion-resistant barrier coating on a substrate.

While the above-identified FIGURES set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The FIGURES may not be drawn to scale, and applications and embodiments of the present invention may include features, steps and/or components not specifically shown in the drawings.

DETAILED DESCRIPTION

The present disclosure provides improved application of CCCs that allows for on-wing repair while minimizing environmental and operator risks. As described further herein, a foaming agent and propellant can be incorporated into an aqueous CCC to create a spray foam CCC (also referred to herein as "spray foam conversion coating" or "foam conversion coating") that can be locally applied and can remain in place without drippage for at least a time period (e.g. 1-20 minutes) needed to allow for reaction at a surface of a substrate to produce a barrier coating on the surface of the substrate. The spray foam conversion coating can permit complex shapes to be coated on-wing or in other manufacturing locations, without the need for a special environmentally controlled area, can reduce or eliminate the need for multiple applications as is required with conventional applicator pens, and can confine the chemical reaction to a specific location thereby preventing contamination or damage to other surfaces or components. The resultant coating can provide barrier protection of the substrate in corrosive environments and can increase a bond strength between the substrate and a primer or other organic coating. Additionally, the barrier coating can form a thin film allowing for electrical conductivity.

As used herein, the term "spray foam" refers to an improved method of applying a CCC to a substrate and is not used to characterize the resulting coating obtained using the disclosed method. The physical and chemical properties of the resulting barrier coating are consistent with those provided by other known methods (e.g., immersion, applicator pens, brush-on, wipe-on) of applying CCCs. Furthermore, it will be understood by one of ordinary skill in the art that the present disclosure is not limited to a particular chemical conversion coating chemistry and can include any aqueous chemical conversion coating known in the art.

The spray foam conversion coating includes a non-hexavalent aqueous chemical conversion coating solution such as a trivalent chromium conversion coating. Various aqueous trivalent chromium conversion coatings are commercially available, including but not limited to Chemeon® eTCP, Chemeon® TCP-HF, Socosurf TCS, SurTec® 650 ChromitAL® TCP, SurTec® 650V ChromitAL® TCP, SurTec® 650C ChromitAL® TCP, and Alodine® T5900RTU, BONDERITE® M-CR T5900 AERO. While the application specifically discloses MIL-DTL-81706 Type II CCCs used for aluminum substrates, it will be understood by one of ordinary skill in the art that the aqueous chemical conversion coating solution can include other aqueous chemical conversion solutions known in the art for application on other metal substrates (e.g., zinc, cadmium, copper, silver, magnesium, tin, iron, or alloys thereof).

The aqueous chemical conversion coating solution is mixed with a foaming agent used to facilitate the formation of foam. The foaming agent is an inert additive that does not chemically react with the aqueous chemical conversion coating solution or the substrate. The foaming agent can include one or more chemicals. The foaming agent can be an anionic alkyl sulfate surfactant such as, sodium laureth sulfate, sodium lauryl ether sulfate, sodium dodecyl sulfate, ammonium lauryl sulfate. In other embodiments, the foaming agent can be triethanolamine used alone or in combination with other surfactants or foaming agents. Surfactants can promote wetting of the substrate surface. Other suitable foaming agents may include blowing agents, which form the gaseous part of the foam. Blowing agents can include gases at the temperature the foam is formed (e.g., carbon dioxide)

or gases generated by chemical reaction (e.g., baking powder, sodium bicarbonate, ammonium carbonate, ammonium bicarbonate, calcium azide, azodicarbonamide, titanium hydride, and isocyanates when they react with water). The foaming agent can be selected to provide a stable foam for a desired reaction time (e.g., 1-20 minutes) on all surface orientations, including vertically-oriented and overhead surfaces and to provide bubbles that are too small to interfere with coating formation on the surface of the substrate.

Additional chemical constituents may be added to provide a desired foam consistency. For example, fatty acids such as myristic acid, palmitic acid or steric acid combined with triethanolamine may be used to thicken the foam or increase stability.

In one example, the spray foam conversion coating can include a mixture of approximately 6.2 to 10.2 weight percent stearic acid, 2.7 to 4.7 weight percent triethanolamine, and 86 to 90 weight percent of commercially available non-hexavalent chromium aqueous conversion coating solution. The commercially available non-hexavalent chromium aqueous conversion coating solution can be made-up per the manufacturer's recommendation and combined in the appropriate amount to make up 86 to 90 weight percent of the total spray foam conversion coating mixture. The pH of the mixture can be adjusted to meet a pH recommended for use of the commercially available non-hexavalent chromium aqueous conversion coating solution. The pH may be raised by using sodium hydroxide, potassium hydroxide, sodium bicarbonate, ammonium carbonate, ammonium bicarbonate. The pH may be lowered by the addition of stearic acid or sulfuric acid. The properly balanced pH mixture can then be inserted into a container and mixed with a propellant to achieve the desired pressurization to expel the mixture.

In another example, the spray foam conversion coating can include approximately 6.2 to 10.2 weight percent myristic acid or palmitic acid in place of stearic acid. In another example, approximately 6.2 to 10.2 weight percent of the spray foam conversion coating can include any combination of two or more of stearic acid, myristic acid, and palmitic acid.

In another example, the spray foam conversion coating can include a combination of foaming agents. For example, approximately 2.7 to 4.7 weight percent of the spray foam conversion coating can include a combination of triethanolamine and any one or more anionic alkyl sulfates, such as sodium laureth sulfate, sodium lauryl ether sulfate, sodium dodecyl sulfate, ammonium lauryl sulfate.

In one example, the spray foam conversion coating mixture can be formed by heating the fatty acid(s) (stearic acid, myristic acid, palmitic acid, or any combination thereof) to a temperature of approximately 179 to 188 degrees Fahrenheit for approximately 40 minutes or until smooth. The fatty acid(s) can be mixed while heating. The fatty acid(s) can be allowed to cool to about 152 degrees Fahrenheit before adding the remaining components. The aqueous chemical conversion coating solution and triethanolamine and/or additional surfactants can be added to the cooled fatty acid(s) and mixed. Mixing can continue while the mixture cools to form a thick liquid. The thick liquid can be forced through a screen (e.g., stainless steel screen) to remove lumps and poured into a container that can be pressurized.

The spray foam conversion coating includes a compressible propellant capable of expanding upon release from a pressurized vessel. The propellant can include, for example carbon dioxide, nitrogen, air or similar non-flammable compressible gases. In some examples, the propellant can be a flammable propellant such as butane, isobutane, or propane. In some examples, the propellant can also act as a foaming agent.

The spray foam conversion coating can be contained in a pressurized vessel, such as a metal can with a spray nozzle. Any vessel capable of containing the pressurized gas and liquid materials disclosed herein can be suitable for delivering the spray foam conversion coating. A handheld can with an operator-triggered delivery mechanism may be suitable for most repair applications. An interior of the vessel can be formed of a material that does not react with constituents of the foam conversion coating to prevent corrosion and leakage and extend a shelf-life of the product. For example, an aluminum can may be lined with polytetrafluoroethylene (PTFE), bisphenol A (BPA), polypropylene, or similar material. A liner material can be the same as a material used to store the aqueous chemical conversion coating solution without the foaming agent and propellant.

The spray foam conversion coating mixture can be poured into the open can. A valve and cover can be fitted onto the can to form a seal and the propellant can be forced into the can through the valve. In some examples, the can contains approximately 4 to 5 volume percent propellant. A larger amount of propellent could dry the spray foam corrosion coating mixture as it comes out of the can, rendering it unusable.

FIG. 1 a flow chart depicting method 10 of producing a corrosion-resistant barrier coating on a substrate. Method 10 includes applying the spray foam conversion coating to a surface of a substrate (step 12), allowing the aqueous chemical conversion coating solution to react with the substrate surface (step 14), and removing the unreacted or excess foam conversion coating from the surface after this reaction is complete (step 16).

The spray foam conversion coating can be applied to a metal substrate that is pre-treated to deoxidize or expose the surface of the metal. The metal substrate can be aluminum or an aluminum alloy. In some embodiments, the metal substrate can be zinc, cadmium, copper, silver, magnesium, tin, iron, or alloys thereof. It will be understood by one of ordinary skill in the art that the type of aqueous conversion coating solution present in the spray foam conversion coating can be used to determine the application for which the spray foam conversion coating is best suited. Pre-treatment can include chemical and or mechanical surface preparation as known in the art. A chemical pre-treatment can include, for example, degreasing with an alkaline degreaser or solvent, such as acetone or isopropanol, rinsing with water, and using an acid cleaner, such as nitric acid, to de-oxidize the surface of the metal substrate. Mechanical pre-treatment can include, for example, grit-blasting, sanding, pumice scrubbing, or abrasive pad processing of the metal substrate, which can be followed by degreasing.

Following surface preparation of the substrate, the spray foam conversion coating can be applied to a wipe or directly to the surface of the substrate via spraying. For example, the spray foam conversion coating can be contained in a handheld spray can with a pressure-triggered spray mechanism (e.g., nozzle or trigger can be pressed by the operator to release contents of the spray can through the nozzle). Various spray devices and nozzles known in the art may be suitable for applying the foam conversion coating and can include both handheld sprayers and robotic or remote-operated devices. In some applications, it may be advantageous to spray the foam conversion coating directly to the substrate surface to be coated. In other applications, it may be difficult to spray directly onto the substrate surface without risking contact with materials surrounding the substrate surface and, therefore, it may be advantageous to apply the spray foam conversion coating to a wipe or tool for hand-held application to the substrate surface. Regardless of the application method, once applied, the foam can remain in place for a time needed for chemical reaction between the aqueous conversion coating and the substrate and, therefore, frequent reapplication is not required.

The spray nozzle can be configured to confine the foam conversion coating to small region of the substrate surface, for example, a diameter ranging from about 1 to 10 cm or surface area ranging from 0.78 to 78.6 $cm^2$. The spray can be any of a variety of shapes known in the art and the spray can be applied from a distance of 1 to 25 cm. Typically, the spray foam conversion coating can be used to repair a single line scratch on a surface or a nominal marking on a surface where the original coating has been removed due to damage. It will be understood by one of ordinary skill in the art that the spray nozzle can be designed as appropriate for the application. The spray foam conversion coating can permit complex shapes to be coated on-wing or in other manufacturing locations, without the need for a special environmentally controlled area. In some examples, the spray foam conversion coating may need to be applied locally to complex shapes during the normal course of manufacture or repair. For example, surfaces occasionally get damaged after leaving the coating facility or during post conversion coating processes (e.g., machining) during manufacture of a component. It may be desirable to touch up the coating in damaged areas without the need for transferring the component back to a coating facility.

Once the foam conversion coating has been applied to the surface of the substrate, the foam conversion coating is left in place to allow the chemical reaction between the aqueous chemical conversion coating solution and the metal substrate to occur. The foam conversion coating remains wet for a period of time that meets or exceeds the time needed for sufficient chemical reaction to occur (e.g., up to 20 minutes). Ions (e.g., chromium ions) of the aqueous chemical conversion coating solution can migrate toward the surface of the substrate while the foam conversion coating remains on the substrate. Reaction with ions within the foam conversion coating on surface of the substrate creates an oxide complex (e.g., aluminum chromium oxide complex) on the surface of the substrate, thereby changing the bare metal into a new, intentionally deposited, selective oxide layer that provides a barrier coating to prevent corrosion and oxidation of the substrate.

A single application of the foam conversion coating can be sufficient for repair or reconditioning of the substrate. The foam conversion coating does not have to be continuously reapplied to ensure formation of the selective oxide layer. The chemical reaction can continue to occur for as long as the foam conversion coating is on the substrate provided the foam conversion coating does not dry. The reaction time can typically range from about 1 minute to about 20 minutes depending on the particular chemistry of the aqueous chemical conversion coating solution. In some environments (e.g., coating applied in the sun), the foam conversion coating may be susceptible to drying and may require mixing or agitating on the surface to ensure the aqueous portion of the foam conversion coating remains in contact with the surface. Additional applications of the foam conversion coating would be permitted in environments where unintentional drying occurs.

The excess or unreacted foam conversion coating is removed from the substrate following a time period determined suitable for chemical reaction (e.g., 1-20 minutes). The foam conversion coating can be removed by wiping the substrate surface with a moist and/or dry wipe (e.g., moist or dry cloth) and disposed of in accordance with local environmental regulations for the aqueous chemical conversion coating solution. Any remaining foam, particularly, inert components of the foam conversion coating, can be removed, for example, with a water-wetted cloth (e.g., microfiber) or other non-abrasive material. Generally, wipes should not contain materials other than water. Wipes containing surfactants or oils could contaminate the surface. Wipes containing solvents could chemically dehydrate the surface during the curing process. Care should be taken to avoid abrading the coating. Any remaining aqueous chemical conversion coating solution can dry in place. The resulting barrier coating does not require post-treatment. The coated substrate can be ready for use once the excess foam has been removed from the surface and the remaining aqueous chemical conversion coating solution has dried. In some embodiments, a primer and or other organic coating can be applied to the barrier coating.

In some embodiments, the spray foam conversion coating can include a visual indicator (e.g., red to violet coloring) as known in the art to confirm presence of the barrier coating on the surface upon inspection after the excess foam has been removed and any remaining aqueous conversion coating has dried.

The disclosed spray foam conversion coating provides a thin film barrier coating having a thickness, for example, of approximately 15 millionths of an inch, allowing for electrical conductivity.

The disclosed spray foam conversion coating can be used to coat any substrate or component subject to corrosion, for example, aluminum components including propeller blades, gear box housings, heat exchangers, electronic fuel control housings, brackets, air cycle machines, turbine blades, valve bodies, aircraft structural body frames, aircraft body panels, and aircraft wheels, among others. While the majority of the examples listed apply to aircraft components, it will be understood that the disclosed spray foam conversion coating can be applied to any metal structure requiring a locally applied conversion coating.

The disclosed spray foam conversion coating can be used for touch-up repair of aircraft surfaces on-wing or on parts that have been removed from the aircraft for reconditioning. The spray foam conversion coating can allow for repair of multiple aircraft parts and surfaces, including difficult-to-reach surfaces, vertical surfaces, and overhead surfaces.

It will be understood by one of ordinary skill in the art that the disclosed foam conversion coating is not limited to aerospace applications and can be used in a variety of applications where chemical conversion coatings are useful. Furthermore, the disclosed foam conversion coating can be used to deliver any known aqueous chemical conversion coating solution and is not limited to the chemical conversion coatings disclosed herein. It will be understood that the disclosed foaming agents and propellants can be mixed with a wide variety of chemical conversion coatings to improve delivery of the chemical conversion coating to a surface and provide particular benefit for localized repair applications.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

DISCUSSION OF POSSIBLE EMBODIMENTS

The following are non-exclusive descriptions of possible embodiments of the present invention.

A spray foam chemical conversion coating includes a non-hexavalent chromium aqueous chemical conversion coating solution, a foaming agent, and a propellant.

The spray foam chemical conversion coating of the preceding paragraph can optionally include, additionally and/or alternatively, any one or more of the following features, configurations and/or additional components:

The spray foam chemical conversion coating of the preceding paragraphs, wherein the aqueous chemical conversion coating solution comprises trivalent chromium.

The spray foam chemical conversion coating of any of the preceding paragraphs, wherein the foaming agent does not react with the aqueous chemical conversion coating solution or the surface to be coated.

The spray foam chemical conversion coating of claim 1, wherein the foaming agent is a surfactant.

The spray foam chemical conversion coating of any of the preceding paragraphs, wherein the foaming agent is selected from the group consisting of triethanolamine, sodium laureth sulfate, sodium lauryl ether sulfate, sodium dodecyl sulfate, and ammonium lauryl sulfate.

The spray foam chemical conversion coating of any of the preceding paragraphs, wherein the spray foam chemical conversion coating comprises approximately 2.7 to 4.7 weight percent foaming agent.

The spray foam chemical conversion coating of any of the preceding paragraphs, wherein the propellent is non-flammable.

The spray foam chemical conversion coating of any of the preceding paragraphs, and further comprising a fatty acid selected from the group consisting of stearic acid, myristic acid, palmitic acid, and combinations thereof.

The spray foam chemical conversion coating of any of the preceding paragraphs, wherein the spray foam chemical conversion coating is contained under pressure until applied via spraying.

A method of producing a corrosion-resistant coating includes spraying a foam chemical conversion coating on a surface of a metal substrate, allowing the foam chemical conversion coating to react with the surface, and removing excess foam chemical conversion coating from the surface. The foam chemical conversion coating contains no hexavalent chromium.

The method of the preceding paragraph can optionally include, additionally and/or alternatively, any one or more of the following features, configurations, additional components, and/or steps:

The method of the preceding paragraphs, wherein the foam chemical conversion coating includes an aqueous chemical conversion coating solution, a foaming agent, and a propellant.

The method of any of the preceding paragraphs, wherein the aqueous chemical conversion coating solution comprises trivalent chromium.

The method of any of the preceding paragraphs, wherein the foaming agent is a surfactant.

The method of any of the preceding paragraphs, wherein the surfactant is selected from the group consisting of triethanolamine, sodium laureth sulfate, sodium lauryl ether sulfate, sodium dodecyl sulfate, and ammonium lauryl sulfate.

The method of any of the preceding paragraphs, wherein the spray foam chemical conversion coating comprises approximately 2.7 to 4.7 weight percent foaming agent.

The method of any of the preceding paragraphs, wherein the period of time ranges from 1 to 20 minutes.

The method of any of the preceding paragraphs, wherein removing the foam chemical conversion coating comprises wiping the foam chemical conversion coating from the surface with a water-wetted wipe.

The method of any of the preceding paragraphs, wherein the foam chemical conversion coating is contained under pressure until sprayed.

The method of any of the preceding paragraphs, wherein the metal substrate is selected from the group consisting of aluminum, zinc, cadmium, copper, silver, magnesium, tin, iron, aluminum based alloys, zinc based alloys, cadmium based alloys, copper based alloys, silver based alloys, magnesium based alloys, iron based alloys, and tin based alloys.

The method of any of the preceding paragraphs, and further comprising pre-treating the metal substrate such that the surface of the metal substrate is deoxidized.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A chemical conversion coating spray foam comprising:
a non-hexavalent chromium aqueous chemical conversion coating solution comprising trivalent chromium;
a foaming agent; and
a propellant.

2. The chemical conversion coating spray foam of claim 1, wherein the foaming agent does not react with the aqueous chemical conversion coating solution or a surface to be coated.

3. The chemical conversion coating spray foam of claim 1, wherein the foaming agent is a surfactant.

4. The chemical conversion coating spray foam of claim 2, wherein the foaming agent is selected from the group consisting of triethanolamine, sodium laureth sulfate, sodium lauryl ether sulfate, sodium dodecyl sulfate, and ammonium lauryl sulfate.

5. The chemical conversion coating spray foam of claim 1, wherein the spray foam chemical conversion coating comprises approximately 2.7 to 4.7 weight percent foaming agent.

6. The chemical conversion coating spray foam of claim 1, wherein the propellent is non-flammable.

7. The chemical conversion coating spray foam of claim 1, and further comprising a fatty acid selected from the group consisting of stearic acid, myristic acid, palmitic acid, and combinations thereof.

8. The chemical conversion coating spray foam of claim 1, wherein the spray foam chemical conversion coating is contained under pressure until applied via spraying.

9. A method of producing a corrosion-resistant coating, the method comprising:
   spraying a chemical conversion coating spray foam on a surface of a metal substrate;
   allowing the chemical conversion coating spray foam to react with the surface; and
   removing excess chemical conversion coating spray foam from the surface;
   wherein the chemical conversion coating spray foam contains no hexavalent chromium and comprises:
      an aqueous chemical conversion coating solution comprising trivalent chromium;
      a foaming agent; and
      a propellant.

10. The method of claim 9, wherein the foaming agent is a surfactant.

11. The method of claim 10, wherein the surfactant is selected from the group consisting of triethanolamine, sodium laureth sulfate, sodium lauryl ether sulfate, sodium dodecyl sulfate, and ammonium lauryl sulfate.

12. The method of claim 9, wherein the chemical conversion coating spray foam comprises approximately 2.7 to 4.7 weight percent foaming agent.

13. The method of claim 9, wherein the chemical conversion coating spray foam is allowed to react with the surface for 1 to 20 minutes.

14. The method of claim 9, wherein removing the chemical conversion coating spray foam comprises wiping the chemical conversion coating spray foam from the surface with a water-wetted wipe.

15. The method of claim 9, wherein the chemical conversion coating spray foam is contained under pressure until sprayed.

16. The method of claim 9, wherein the metal substrate is selected from the group consisting of aluminum, zinc, cadmium, copper, silver, magnesium, tin, iron, aluminum based alloys, zinc based alloys, cadmium based alloys, copper based alloys, silver based alloys, magnesium based alloys, iron based alloys, and tin based alloys.

17. The method of claim 9 and further comprising pretreating the metal substrate such that the surface of the metal substrate is deoxidized.

* * * * *